UNITED STATES PATENT OFFICE.

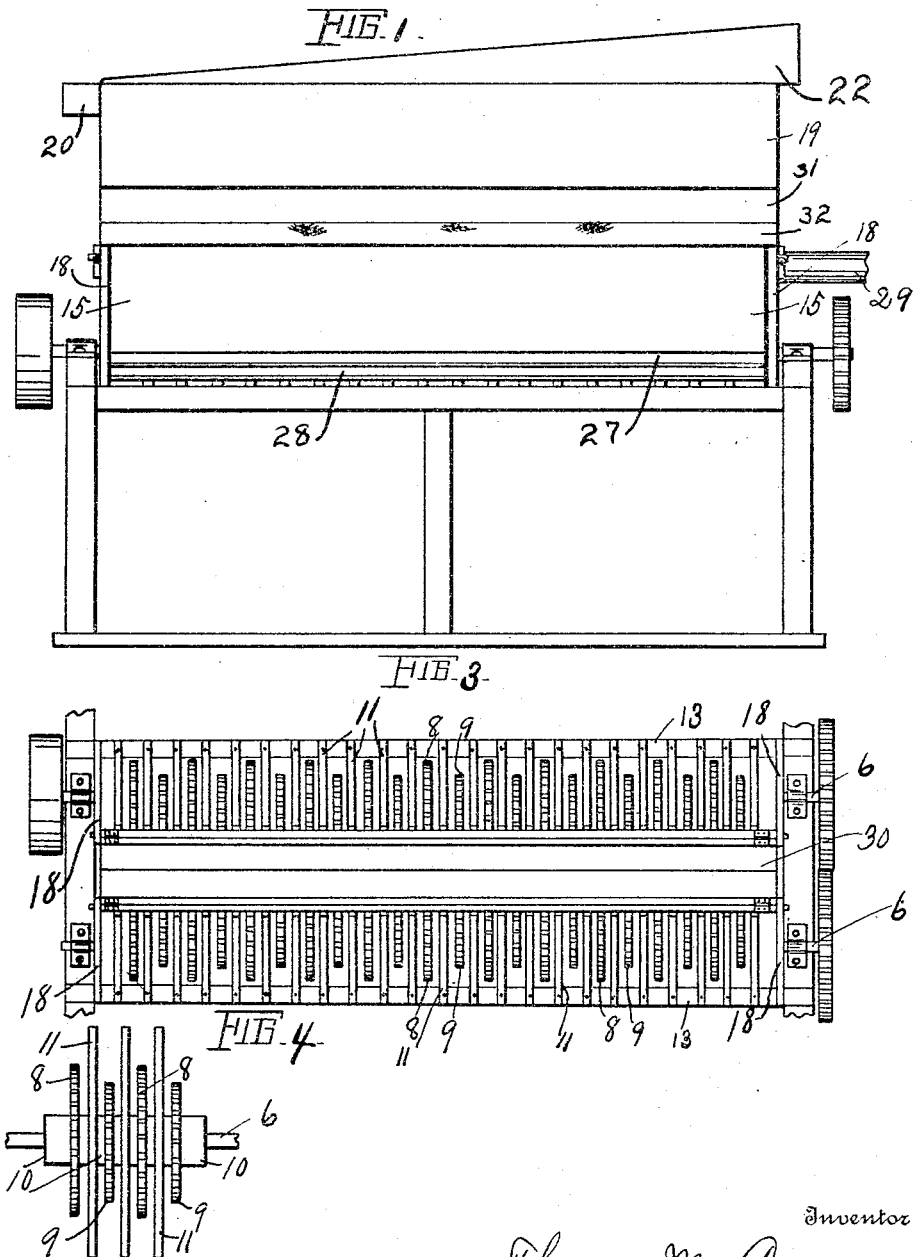

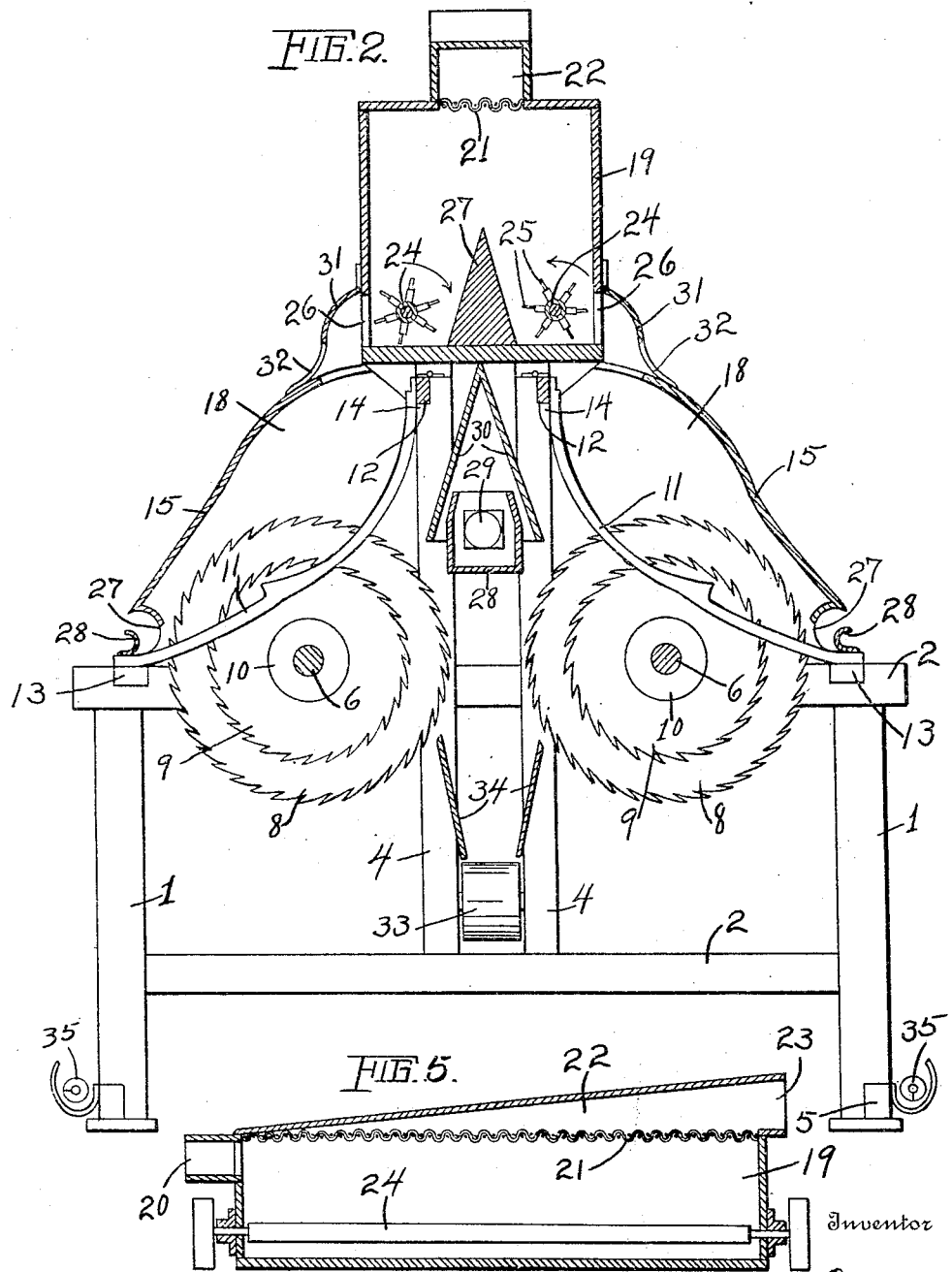

THOMAS M. CASS, OF TYLER, TEXAS.

APPARATUS FOR SEPARATING AND CLEANING HULLS AND TRASH FROM SEED-COTTON.

1,287,222. Specification of Letters Patent. Patented Dec. 10, 1918.

Application filed June 12, 1917. Serial No. 174,208.

*To all whom it may concern:*

Be it known that I, THOMAS M. CASS, a citizen of the United States of America, residing at Tyler, in the county of Smith and State of Texas, have invented certain new and useful Improvements in Apparatus for Separating and Cleaning Hulls and Trash from Seed-Cotton, of which the following is a specification.

My invention relates to apparatus for separating and cleaning hulls and trash from seed cotton and more particularly to a machine to be used with a boll threshing machine; and the object is to provide an apparatus which can be used with a boll threshing machine, such as shown in my Patent, No. 1,219,701, March 20, 1917, and which can be used not only to separate the hulls from the seed cotton, but to clean the cotton of other trash and dirt and dust. Another object is to provide means for doffing the cotton from the saws with an air blast so that damp seed cotton as well as dry seed cotton can be cleaned. Other advantages are that the machine is adaptable for cleaning and feeding cotton to any desirable number of gins and the machine or apparatus is highly efficient in operation. Other objects and advantages will be fully explained in the following description and the invention will be more particularly pointed out in the claims.

Reference is had to the accompanying drawings which form a part of this application.

Figure 1 is a side elevation of the apparatus assembled. Fig. 2 is a vertical section of the same. Fig. 3 is a plan view in part, showing the saws in the ribs. Fig. 4 is an enlarged detail view of the saws of different sizes and the ribs. Fig. 5 is a detail view of the receiving box.

Similar characters of reference are used to indicate the same parts throughout the several views.

The apparatus is provided with a frame consisting of posts 1, cross beams 2, longitudinal beams 5, bracing posts 3 and 4. Saw shafts 6 are journaled in boxes 7 which are attached to beams 2. One of the features of this invention is the arrangement of saws. Saws of different diameters are provided and the saws 8 of greater diameter and saws 9 of less diameter are rigidly mounted on the shafts 6 and provided with the usual space blocks 10. The machine is provided with ribs 11 which are attached to bars 12 and 13. The bars 13 lie loosely on the beams 2. The saws 8 and 9 running between the ribs 11 tend to hold the bars 3 down on the beams 2. The ribs 11 are attached to the bars 12 and these bars are hinged to the upper part of the posts 4 and shoulders 14 are formed on the posts 4 by cutting away portions of the posts 4. The entire set of ribs on each side of the machine can be swung upwardly to substantially horizontal positions for cleaning or for removing the saws from the stand. The machine is provided with roll boards 15 which are hung on the frame by means of lugs 16 which are caught in hooks or bearings 17 which are open so that the roll boards can be removed when necessary to give attention to the ribs 11. The roll boards 15 stand between the end pieces 18 or roll board ends which are attached to the bars 12 and 13 and move with the ribs 11.

A receiving box or receiver 19 is mounted above the cleaning apparatus or separating apparatus. Seed cotton is fed into the receiver 19 through an inlet 20. The receiver 19 is provided with a screen for closing the upper part of the box or receiver to prevent cotton from passing and to provide an escape for wind and dust. A tapering box like structure is mounted above the screen for escape of the air from the cotton and this air-escape 22 projects beyond the receiver 19 to form a connection 23 with a flue which is connected with the fan (not shown). The cotton falls in the receiver and is forced out of the receiver 19 by means of agitating feeders 24 which consist of fluted rollers with spikes 25 in the outward portions of the flutes. The feeders 24 are driven by any suitable gearing but must be revolved toward each other on the upper sides so that the cotton will be thrown toward the center and then out of the receiver through openings 26 and down into the roll boxes. A divider board 27 is provided to cause substantially equal amounts of cotton to be acted upon by the agitators or feeders 24. The seed cotton is thus received and fed to the roll boxes where the hulls are separated from the cotton.

The cotton falls into the roll boxes to be acted upon by the saws 8 and 9 in conjunction with the ribs 11. The cotton will be separated from the hulls by drawing the seed cotton down between the ribs 11. The hulls will pass down through the outlets 27.

The hulls are retarded in the outlet by baffles 28 which retard the hulls, preventing them from falling before they are thoroughly separated from the cotton. There will be particles of cotton among the hulls and if the hulls are retarded so that the saw teeth will run through the mass of hulls, all the cotton will be taken from the hulls. The saws 8 and 9 are of different diameters for causing a more thorough cleaning of the cotton from the hulls. If the saws were all of the same diameter, the hulls would tend to ride in a mass over the saws. But the saws being of different diameters, the hulls will be shifted along with the cotton and there will be no mass of hulls moving together. The mass will be broken or stirred so that the separation will be completely effected.

The saws will carry the seed cotton through the ribs and much of the cotton will fall from the saws, since the saws are not driven as fast as saws in ginning cotton. But a doffing means must be provided. I have provided means for doffing the cotton from the saws by means of air-blasts. An air chute 28 is provided in close proximity to the saws and this chute or box 28 is provided with an air inlet 29. The air escapes from the box 28 upwardly and is deflected downwardly by deflectors 30 which cause the air to doff the cotton from the saw teeth.

The cotton and hulls are directed to the roll boxes 18 by aprons 31 which are attached to receiver 19. These aprons extend the full length of the machine and have valves or flexible members 32 for making a practically air-tight closure against the roll boards 18 so that the air will not interfere with the lifting of the cotton from the wagons or other supply source. The valves 32 make the passage ways to the roll boxes somewhat expansible.

When the cotton is doffed from the saws, it is caught on a traveling endless conveyer 33 for delivering the cotton to be distributed to the gins. Cotton is directed to the conveyer 33 by deflectors 34. The hulls are carried away by screw conveyers 35.

The feeders 24 and the saw shafts 6 are to be driven by any suitable power and driving gear.

What I claim, is,—

1. A cotton separating and cleaning apparatus comprising a pair of gangs of saws, each gang having saws of different diameters, a roll box for each gang of saws, ribs partly between said saws, a receiver for separating the cotton from the air, means in said receiver for feeding stock to said roll boxes, and aprons provided with flexible members for guiding the stock to the roll boxes.

2. A cotton separating and cleaning apparatus comprising a pair of gangs of saws, a roll box for each gang of saws, ribs partly between said saws, a receiver for separating the cotton from the air, means in said receiver for feeding cotton to said roll boxes, aprons provided with flexible members for guiding the cotton to said roll boxes, and baffles coöperating with said ribs.

3. A cotton separating and cleaning apparatus comprising a pair of gangs of saws, a roll box for each gang of saws, ribs partly between said saws, a receiver for separating the cotton from the air, a divider board in said receiver, revolving feeders turning toward said board to feed cotton to said roll boxes, guides provided with flexible members for directing the cotton to said roll boxes, and baffles at the hull-outlets of said roll boxes.

4. A cotton separating and cleaning apparatus comprising a pair of gangs of saws, a roll box for each gang of saws, means for feeding cotton to each roll box, means for driving said saws, and means for doffing the cotton from said saws consisting of an open top air-feed box, and an inverted V-shaped deflector commencing above said air-feed box and terminating on the sides thereof for directing the air on the saw teeth.

In testimony whereof, I set my hand, this 22nd day of May, 1917.

THOMAS M. CASS.

Copies of this patent may be obtained for five cents each, by addressing the "Commissioner of Patents, Washington, D. C."